United States Patent
Maaref

(10) Patent No.: US 10,251,110 B2
(45) Date of Patent: Apr. 2, 2019

(54) METHOD AND SYSTEM FOR ADAPTIVE CHANNEL ACCESS IN UNLICENSED SPECTRUM

(71) Applicant: Huawei Technologies Co., Ltd., Shenzhen (CN)

(72) Inventor: Amine Maaref, Kanata (CA)

(73) Assignee: Huawei Technologies Co., Ltd., Shenzhen (CN)

(\*) Notice: Subject to any disclaimer, the term of this patent is extended or adjusted under 35 U.S.C. 154(b) by 83 days.

(21) Appl. No.: 14/924,640

(22) Filed: Oct. 27, 2015

(65) Prior Publication Data

US 2016/0295488 A1 Oct. 6, 2016

Related U.S. Application Data

(60) Provisional application No. 62/140,972, filed on Mar. 31, 2015.

(51) Int. Cl.

| | |
|---|---|
| *H04W 24/02* | (2009.01) |
| *H04W 24/08* | (2009.01) |
| *H04W 36/22* | (2009.01) |
| *H04W 48/20* | (2009.01) |
| *H04W 72/08* | (2009.01) |
| *H04W 84/12* | (2009.01) |
| *H04W 88/08* | (2009.01) |
| *H04W 74/08* | (2009.01) |
| *H04W 36/30* | (2009.01) |
| *H04W 88/10* | (2009.01) |

(52) U.S. Cl.
CPC ........... *H04W 36/30* (2013.01); *H04W 24/02* (2013.01); *H04W 24/08* (2013.01); *H04W 36/22* (2013.01); *H04W 72/085* (2013.01); *H04W 74/08* (2013.01); *H04W 48/20* (2013.01); *H04W 84/12* (2013.01); *H04W 88/08* (2013.01); *H04W 88/10* (2013.01)

(58) Field of Classification Search
CPC ..... H04W 36/30; H04W 74/08; H04W 24/02; H04W 24/08; H04W 72/085; H04W 48/20; H04W 84/12; H04W 88/08
USPC .......................................................... 455/438
See application file for complete search history.

(56) References Cited

U.S. PATENT DOCUMENTS

| | | | |
|---|---|---|---|
| 8,155,102 B1 | 4/2012 | Hakola et al. | |
| 9,311,446 B1 * | 4/2016 | Sathyamurthy | ......... G06F 17/60 |
| 2004/0170150 A1 | 9/2004 | Guo et al. | |

(Continued)

FOREIGN PATENT DOCUMENTS

| | | |
|---|---|---|
| CN | 103702434 A | 4/2014 |
| CN | 104469849 A | 3/2015 |

(Continued)

OTHER PUBLICATIONS

WBA,"Community Wi-Fi White Paper", Version: 1.0,Wireless Broadband Alliance,Sep. 12, 2014,total 100 pages.

(Continued)

*Primary Examiner* — Shahriar Behnamian
(74) *Attorney, Agent, or Firm* — Slater Matsil, LLP

(57) ABSTRACT

A method and a device for adaptive channel access are disclosed. In an embodiment includes adaptively adjusting, by a small base station (SBS), access parameters for small cells to ensure quality of service (QoS) to cellular users while minimizing collision probability for WiFi users.

20 Claims, 9 Drawing Sheets

(56) References Cited

U.S. PATENT DOCUMENTS

| | | | |
|---|---|---|---|
| 2013/0017794 A1* | 1/2013 | Kloper | H04W 74/0808 455/63.1 |
| 2013/0337821 A1* | 12/2013 | Clegg | H04L 5/0062 455/452.1 |
| 2014/0269524 A1 | 9/2014 | Xiao et al. | |
| 2014/0341018 A1 | 11/2014 | Bhushan et al. | |
| 2016/0014610 A1* | 1/2016 | Wong | H04W 74/002 455/454 |
| 2016/0174233 A1* | 6/2016 | Emmanuel | H04W 24/08 370/252 |

FOREIGN PATENT DOCUMENTS

| | | |
|---|---|---|
| EP | 2675205 A2 | 12/2013 |
| WO | 2015035210 A1 | 3/2016 |

OTHER PUBLICATIONS

"Co-Existence Results using LBT Category 4 (LBE with Variable Contention Window)," Agenda Item: 2.1, Source: Huawei, HiSilicon, Documents for: Discussion/Decision, 3GPP TSG RAN WG1 Ad-hoc Meeting, R1-150975, Mar. 24-26, 2015, 5 pages.

Babaei, A. et al., "Overview of EU LBT and its Effectiveness for Coexistence of LAA LTE and Wi-Fi," IEEE 802.19-14/0082r0, Nov. 4, 2014, 11 pages.

Bhorkar, A. et al., "Performance Analysis of LTE and Wi-Fi in Unlicensed Band Using Stochastic Geometry," 2014 IEEE 25th International Symposium on Personal, Indoor and Mobile Radio Communications, Sep. 2-5, 2014, 5 pages.

Bhorkar, A. et al., "Medium Access Design for LTE in Unlicensed Band," 2015 IEEE Wireless Communications and Networking Conference Workshops, Mar. 9-12, 2014, 369-373 pages.

Bianchi, G., "Performance Analysis of the IEEE 802.11 Distributed Coordination Function," IEEE Journal on Selected Areas in Communications, vol. 18, No. 3, Mar. 2000, 13 pages.

Bianchi, G. et al., "Kalman Filter Estimation of the Number of Competing Terminals in an IEEE 802.11 Network," INFOCOM 2003, IEEE Societies Twenty-Second Annual Joint Conference of the IEEE Computer and Communications, vol. 2, Mar. 30-Apr. 3, 2003, 9 pages.

Elsherif, A.R. et al., "Adaptive Small Cell Access of Licensed and Unlicensed Bands," 2013 IEEE International Conference on Communications, Jun. 9-13, 2013, 6 pages.

Gamage, A.T. et al., "Uplink Resource Allocation for Interworking of WLAN and OFDMA-based Femtocell Systems," 2013 IEEE ICC Wireless Networking Symposium, Conference on Communications (ICC), Jun. 9-13, 2013, 5 pages.

Hajmohammad, S. et al., "Unlicensed Spectrum Splitting Between Femtocell and WiFi," 2013 IEEE ICC Ad-Hoc and Sensor Networking Symposium, Conference on Communications (ICC), Jun. 9-13, 2013, 6 pages.

Ismail, M. et al., "A Distributed Multi-Service Resource Allocation Algorithm in Heterogeneous Wireless Access Medium," IEEE Journal on Selected Areas in Communications, vol. 30, No. 2, Feb. 2012, 8 pages.

Liu, F. et al., "A Framework for Femtocells to Access Both Licensed and Unlicensed Bands," 2011 International Symposium on Modeling and Optimization in Mobile, Ad Hoc and Wireless Networks (WiOpt), May 9-13, 2011, 5 pages.

Liu, F. et al., "Dual-Band Femtocell Traffic Balancing Over Licensed and Unlicensed Bands," International Workshop on Small Cell Wireless Networks 2012, 6 pages.

Ratasuk, R. et al., "License-Exempt LTE Deployment in Heterogeneous Network," 2012 International Symposium on Wireless Communication Systems (ISWCS), Aug. 28-31, 2012, 5 pages.

Zhang, N. et al., "Unlicensed Spectrum Usage Method for Cellular Communication Systems," 2012 8th International Conference on Wireless Communications, Networking and Mobile Computing (WiCOM), Sep. 21-23, 2012, 6 pages.

* cited by examiner

METHOD AND SYSTEM FOR ADAPTIVE CHANNEL ACCESS IN UNLICENSED SPECTRUM

This application claims the benefit of U.S. Provisional Application No. 62/140,972, filed on Mar. 31, 2015, which application is hereby incorporated herein by reference

TECHNICAL FIELD

The present invention relates to a method and system for wireless communications, and, in particular embodiments, to a method and system for adaptive listen-before-talk (LBT) channel access for unlicensed spectrum.

BACKGROUND

It is predicted that mobile data usage will increase by 11-fold by 2018. To deal with this challenge, many new techniques have been proposed to improve data rate in the fifth generation (5G) wireless communication systems. However, the scarcity of the licensed spectrum for cellular networks is still the main bottleneck for further improvement of data rate. As a result, exploiting the unlicensed bands in small cells, currently used by WiFi, becomes a promising option.

WiFi is the most popular and successful technology to provide wireless service on unlicensed bands in a local area. With low cost and high data rate, WiFi systems already are the dominant player on all unlicensed bands in 2.4 GHz and 5 GHz. Most consumer electronic devices now come with a WiFi module. However, its spectrum efficiency is low when the network is overloaded.

SUMMARY

An embodiment method for adaptive channel access includes a small base station (SBS) adaptively adjusting access parameters for small cells to ensure quality of service (QoS) to cellular users while minimizing collision probability for WiFi users.

An embodiment method for adaptive channel access includes adaptively adjusting, by a small base station (SBS), access parameters for small cells to ensure quality of service (QoS) to cellular users while minimizing a collision probability to WiFi users, wherein minimizing the collision probability to the WiFi users comprises keeping or decreasing an optimal backoff window size when the collision probability to the WiFi users is below a threshold value and increasing the optimal backoff window size when the collision probability to the WiFi users is above the threshold value.

An embodiment method for adaptive channel access includes determining, by a small base station (SBS), a fraction of SBS air time share on an unlicensed band for cellular users to ensure quality of service (QoS) for the cellular users, estimating, by the SBS, a number of WiFi users on the unlicensed band, adjusting, by the SBS, the fraction of SBS air time share on the unlicensed band for the cellular users when a collision probability to the WiFi users is above a threshold value and not adjusting, by the SBS, the fraction of SBS air time share on the unlicensed band for the cellular users when the collision probability to the WiFi users is below the threshold value.

An embodiment SBS includes a processor configured to adaptively adjust access parameters for small cells to ensure QoS to cellular users while minimizing collision probability for WiFi users.

An embodiment small base station (SBS) comprises a processor and a non-transitory computer readable storing medium storing programming for execution by the processor, the programming including instruction to adaptively adjust access parameters for a small cell to ensure quality of service (QoS) to cellular users while minimizing a collision probability to WiFi users, wherein minimizing the collision probability to the WiFi users comprises keep or decrease an optimal backoff window size when the collision probability to the WiFi users is below a threshold value and to increase the optimal backoff window size when the collision probability to the WiFi users is above the threshold value.

An embodiment SBS includes a processor and a non-transitory computer readable storage medium storing programming for execution by the processor. The programming includes instructions for initializing a maximum fraction of SBS air time shared on an unlicensed spectrum according to a WiFi traffic estimate, determining an amount of available licensed spectrum does not guarantee a quality of service (QoS) to small cell users, determining power and rate optimization to minimize a collision probability of WiFi users, and determining an SBS backoff window size.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
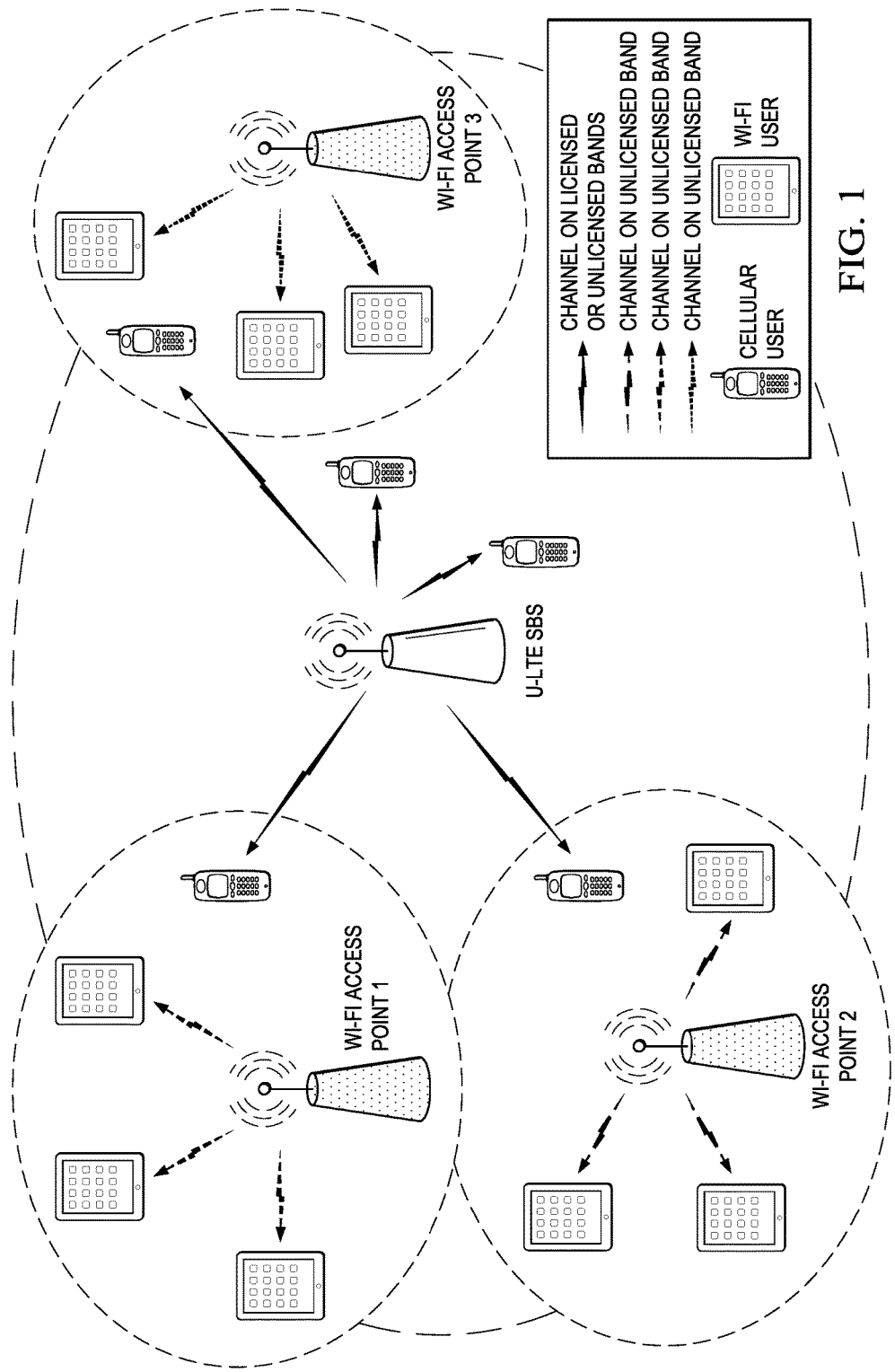
FIG. 1 illustrates a system model.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Listen-before-talk (LBT) regulations in the unlicensed spectrum (e.g., 5G unlicensed (5G-U) spectrum) require equipment to check for potential occupants of the unlicensed spectrum, i.e., listen, before transmitting, i.e., talk. LBT is a mandated requirement for using the unlicensed spectrum in some regions. Moreover, LBT has been adopted as a working assumption for licensed assisted access (LAA) study item in release 13 of LTE-A. The LBT-compatible access method may be unfair to WiFi users when the number of cellular users increases. In addition, existing LBT access protocols, such as 802.11 distributed coordination function (DCF), are fixed and therefore non-adaptive. That is, they are unable to provide on-demand access to the unlicensed spectrum depending on the availability of licensed spectrum resources, to guarantee quality of service (QoS) for the cellular users, or to ensure that the collision probability of the WiFi users is below a certain threshold.

With these channel selection access methods the unlicensed band may be inefficiently used.

In markets without LBT requirements, 5G mobile operators can adopt a duty cycle approach to share the spectrum fairly with other unlicensed spectrum incumbents such as WiFi. In the duty cycle approach, the small base station (SBS) controls the utilization of unlicensed bands.

Embodiments of the invention enable a LTE (U-LTE) SBS to access the unlicensed bands. Embodiments provide a fair coexistence between cellular users and WiFi users on the unlicensed bands and the joint use of the licensed and unlicensed bands for the cellular users in the SBS.

Further embodiments of the invention provide an adaptive channel access scheme for small cells to share the unlicensed spectrum with WiFi access points (APs). In embodiments, the method adaptively adjusts access parameters for the small cells to ensure QoS for cellular users while minimizing collision probability for WiFi users.

According to embodiments, the adaptive LBT channel access scheme allows the cellular users to access the unlicensed spectrum. In embodiments access probability parameters are adaptively adjusted to minimize collision probability to the WiFi system. The parameters may be the WiFi traffic in the unlicensed band(s), available licensed bandwidth, and the QoS requirements of the cellular users. These parameters are also jointly considered to provide and adjust if necessary a minimum backoff window size for the unlicensed spectrum at the small cell. Embodiments relate to integrated spectrum access with dual operation over both the licensed and unlicensed spectrums.

FIG. 1 shows several WiFi access points (WiFi APs) in the coverage of a single small base station (SBS). The SBS can support both licensed and the unlicensed bands to support (uplink, downlink or uplink and downlink) transmission(s) to the cellular users. The small base station may support a small cell. A small cell may be a low-powered radio access node that operates in a licensed and an unlicensed spectrum and that typically has a range of several meters to 1 or 2 kilometers. The small cell is "small" compared to a mobile macro cell (supported by a macro cell base station), which may have a range of a few tens of kilometers.

In some embodiments small cells may encompass femtocells, picocells or microcells. In other embodiments small cells provide a small radio footprint, which can range from 10 meters within an urban or in in-building locations to 2 km for a rural location. Picocells and microcells may have a range of a few hundred meters to a few kilometers. In various embodiments the small cell may comprise a Home eNode B (HeNB) as an LTE femtocell.

The some embodiments the small cell base station has a maximum transmit power of up 30 dBm in the unlicensed band.

The WiFi AP(s) may only use the unlicensed bands to serve the WiFi users and different WiFi APs may use different unlicensed bands to avoid strong co-channel interference. The number of cellular users in the SBS and WiFi APs is N, $n_k$ for each WiFi AP K.

Figure 2:
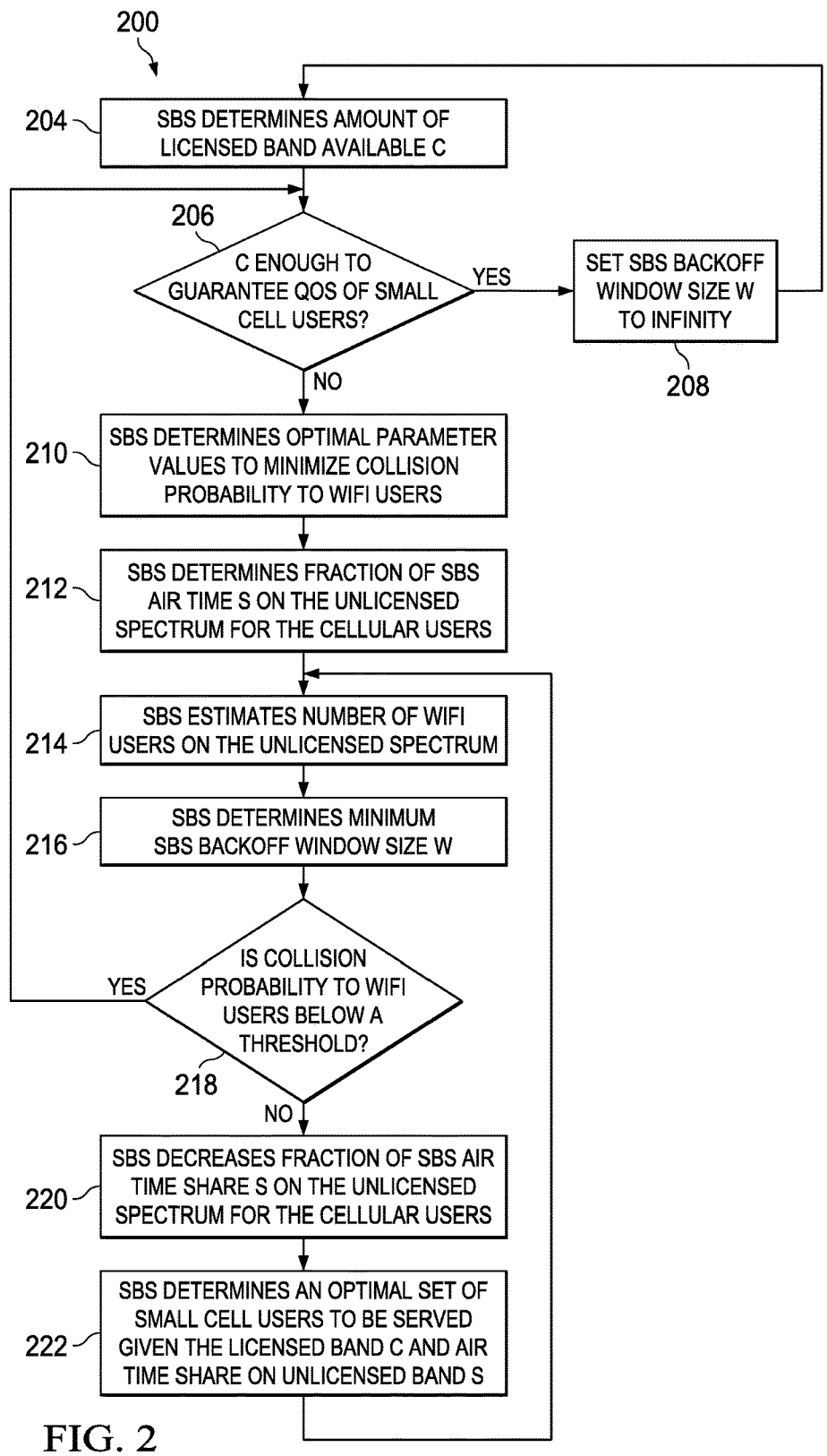
FIG. 2 illustrates an adaptive channel access scheme according to embodiments of the invention.

An adaptive channel access scheme 200 according to an embodiment is illustrated in the flow chart of FIG. 2. Here, the backoff window size W of the SBS for the unlicensed band is adaptively adjusted based on WiFi traffic (traffic load), QoS requirements of the cellular users (e.g., minimum rate requirement for small cell users) and the available licensed bandwidth. In embodiments the backoff window size W may be a minimum backoff window size. The backoff window size W is not fixed as in conventional systems. As will be discussed below, when there is enough achievable licensed bandwidth to serve the cellular users the SBS will not access the unlicensed band(s). In contrast, when there is not enough available licensed bandwidth the SBS will access the unlicensed band(s). The access to the unlicensed band(s) may be restricted for the cellular users when the collision probability for the WiFi users passes a certain threshold and is too high.

The available licensed bandwidth and the available unlicensed bands are jointly allocated to improve the overall spectrum efficiency of the cellular system and to minimize the impact on the WiFi system. Even though the collision probability is minimized, it may still exceed a threshold value which WiFi APs can tolerate due to the large number of cellular users. The access to the unlicensed bands may be balanced by an admission control scheme in order to provide fair utilization of the unlicensed bands for the WiFi users.

The process starts with processing block 204. In processing block 204, the SBS determines the amount of available licensed band C.

Then, in decision block 206, the SBS judges whether the available licensed band C is enough to serve all cellular users. If the available licensed band C is enough to guarantee QoS to serve all present cellular users then the SBS backoff window size W is set to infinity at processing block 208. The process returns to processing block 204 where the SBS determines again the amount of available licensed band C. If there is not enough licensed band available, the process advances to processing block 210. In this scenario the available licensed spectrum does not guarantee QoS to all cellular users.

At processing block 210 the SBS determines optimal parameter values to minimize the collision probability to WiFi users. This is equivalent to minimize the impact brought by the SBS on the unlicensed band(s). For example, the optimization problem can be described as minimizing the total amount of air time share required by the cellular system on the unlicensed spectrum in order to satisfy the QoS for the cellular users.

In some embodiments the minimum impact of the SBS can be formulated as:

$$\min_{\{(c_i^{(l)}, s_i^{(u)}, p_i^{(l)})_{i \in U}\}} \sum_{i \in U} S_i^{(u)} \quad \text{(Equation)}$$

wherein $$R_i \geq r_i, \forall i \in U;$$

is the data rate requirement for each cellular user i. The data rate may be guaranteed in every time slot t, wherein $r_i$ is the minimum data rate for the cellular user i. In some embodiments the minimum data rate ensures the QoS requirements of the cellular user or, in other words, the QoS requirement corresponds to the minimum data rate or is the same as he minimum data rate. The equation further requires that the bandwidth allocation is smaller than $C_L$ and fulfills $$\sum_{i \in U} c_i^{(l)} \leq C_L,$$

and that the transmit power is constrained on the licensed band according to the following equation:

$$\sum_{i \in U} p_i^{(l)} \leq P_T^{(l)},$$

for all $p_i^{(l)}$ greater or equal to 0, $c_i^{(l)}$ greater or equal to 0, $s_i^{(u)}$ greater or equal to 0 and for all cellular users i element of U.

The Equation minimizes the collision probability experienced by WiFi users at each time slot t. The channel collision probability of the WiFi users monotonically increases with the channel access probability of the SBS. Therefore, higher channel access probability incurs higher collision probability. On the contrary, the available unlicensed bandwidth at the SBS monotonically increases with the channel access probability. Accordingly, minimizing the collision probability to WiFi users is equivalent to minimizing the required unlicensed band at the SBS.

The SBS may determine the optimal minimum amount of bandwidth needed to provide QoS to the cellular users based on the transmission power $p_i^{(l)}$ allocated on the licensed band for the cellular users i, the licensed bandwidth $c_i^{(l)}$ allocated to the cellular user i and the time fraction $s_i^{(u)}$ allocated to the cellular user i on the unlicensed band for the WiFi AP. In some embodiments, the optimal values can be found by minimizing the sum for the time fraction $s^{(u)}_{(i)}$ for all cellular users i.

In some embodiments, the optimal transmission power $p_i^{(l)}$ and the optimal fraction of the licensed band $c_i^{(l)}$ can be determined by applying Lagrangian multipliers (e.g., conventional Lagrangian multipliers) based on Karush-Kuhn Tucker (KKT) conditions to the Equation.

After determining the optimal amounts of air time share value $s_i^{(u)}$, transmit power $p_i^{(l)}$ and bandwidth allocation to the licensed band $c_i^{(l)}$, the process advances to processing block 212. Here the SBS determines the current fraction of SBS air times on the unlicensed spectrum, $S^{(u)}(t)$ (e.g., for all cellular users). If the Equation is 0 (i.e., $S_i^{(u)}=0$) no air time share S is needed on the unlicensed band. In other words, the cellular users can be served exclusively on the licensed band. If the Equation is greater than 0, air time share S on the unlicensed band is required to satisfy the QoS for the cellular users.

In the next process block, block 214, the SBS estimates the number of WiFi users on the unlicensed spectrum. The number of WiFi users on the unlicensed band may be estimated by applying a Kalman filtering estimation method.

In the next process block, block 216, the SBS determines the minimum backoff window size W based on the optimal factors for $p_i^{(l)}$, $c_i^{(l)}$, $s_i^{(u)}$ and $S^{(u)}(t)$, and an estimation of a number of WiFi users on the unlicensed band.

Based on the optimal factors, the collision probability $p^{(WF)}$ of the WiFi users on the unlicensed band and the channel access probability of the SBS $\eta^{(BS)}$ is calculated based on $$S^{(u)}(t) = \eta^{(BS)}(t)1 - \tau(t))^n$$

wherein $\tau$ is the stationary probability that the n WiFi users served by the WiFi AP transmit a packet. Substituting the determined optimized required band on the unlicensed band $S^{(u)}$ in this equation a relationship between $\tau$ and $\eta^{(BS)}$ can be obtained.

With this relation the following equations become two nonlinear equations with two unknown variables $\tau$ and $p^{(WF)}$:

$$T_k = \frac{2 \times (1 - 2p_k^{(WF)})}{(1 - 2p_k^{(WF)})(W_k^{(WF)} + 1) + p_k^{(WF)} W_k^{(WF)} \left(1 - (2p_k^{(WF)})^{m_k^{(WF)}}\right)}$$

wherein $W_k^{(WF)}$ is the backoff off window size of the WiFi AP k and $m_k^{(WF)}$ is the maximum contention stage for the WiFi AP k. The collision probability $p_k^{(WF)}$ for the WiFi AP k is:

$$p_k^{(WF)} = 1 - (1 - \eta_k^{(BS)})(1 - \tau_k)^{n_k - 1}, \forall k \in \{1, \ldots, K\}$$

$$p_k^{(BS)} - 1 - (1 - \tau_k)^{n_k}, \forall k \in \{1, \ldots, K\},$$

Accordingly, the variables $\tau$, $p^{(WF)}$ and $\eta^{(BS)}$ can be calculated. Finally, the minimum backoff window size W (e.g., $W_k^{(BS)}$) can be derived from the channel access probability $\eta^{(BS)}$ of the SBS based on the following formula:

$$\eta_k^{(BS)}\left(W_k^{(BS)}\right) = \frac{2\left(1 - 2p_k^{(BS)}\right)}{\left(1 - 2p_k^{(BS)}\right)\left(W_k^{(BS)} + 1\right)}$$

The minimum backoff window size is in a range between 20 ms and 640 ms in some embodiments. In other embodiments the backoff window size W is between 100 ms and 300 ms. In yet other embodiments any suitable time range may be used.

Then the process advances to decision block 218. In decision bock 218 the SBS determines whether or not the collision probability to the WiFi users is below a threshold value. If the collision probability is below the threshold value the SBS uses the determined fraction of SBS air time share S on the unlicensed band. Therefore, the SBS keeps or reduces the minimum backoff window size W as set in processing block 216. The process then moves back to decision block 206 and evaluates again whether or not the licensed band provides enough bandwidth to support the present cellular users. Based on the decision in the decision block 206 the process repeats or iterates the steps 206/208/204 or 206-214.

If the collision probability is above the threshold value the SBS cannot utilize the determined fraction of SBS air time S. The SBS air time share S on the unlicensed band must be reduced. In order to achieve this, the process advances to processing block 220. Here, the SBS decreases the fraction of SBS air time S on the unlicensed band. This means that the SBS has to perform admission control on the cellular users. Accordingly, not all cellular users can be serviced by the SBS. In other words, not all cellular users who request admission to the licensed and unlicensed bands will be admitted to these bands. Some of the cellular users will be rejected so that the collision probability for the WiFi users is kept at a certain level. By rejecting admission to some cellular users the air time share S on the unlicensed band of the cellular users is reduced.

By increasing the backoff window size (e.g., minimum backoff window size), the SBS is less aggressive in accessing the unlicensed spectrum and by decreasing the backoff window size (e.g., minimum backoff window size), the SBS is more aggressive. Accordingly, the SBS increases the minimum backoff window size when the collision probability to the WiFi users is above the threshold value and the SBS keeps or reduces the minimum backoff window size when the collision probability of the WiFi users is below the threshold.

Moreover, the minimum backoff window size W may determine the SBS air time fraction S on the unlicensed band. The more aggressive the minimum backoff window size W is set the more air time share is used on the unlicensed band. If the minimum backoff window size is increased, less SBS air time share can be utilized.

The process advances to process block 222. The SBS determines an optimal set of cellular users (based on all cellular users requesting admission to the system). The process moves back to process block 214 and iterates steps 214-218. The number of cellular users who are admitted to the SBS may be optimized so that a maximum number of cellular users are admitted to the SBS.

In some embodiments the SBS may exploit not only one unlicensed band but more than one unlicensed bands. For example, the SBS may exploit a plurality of unlicensed bands via a plurality of WiFi APs in order to minimize the number of unserved cellular users. In other words, the more unlicensed bands are available the more cellular users can be served without (substantially) impacting the WiFi users at the different WiFi APs.

In some embodiments, the method provides a solution to balance the collision probability among the plurality of WiFi APs. Accordingly, the optimization can be described as minimizing the maximum collision probability among all WiFi APs.

Figure 3:
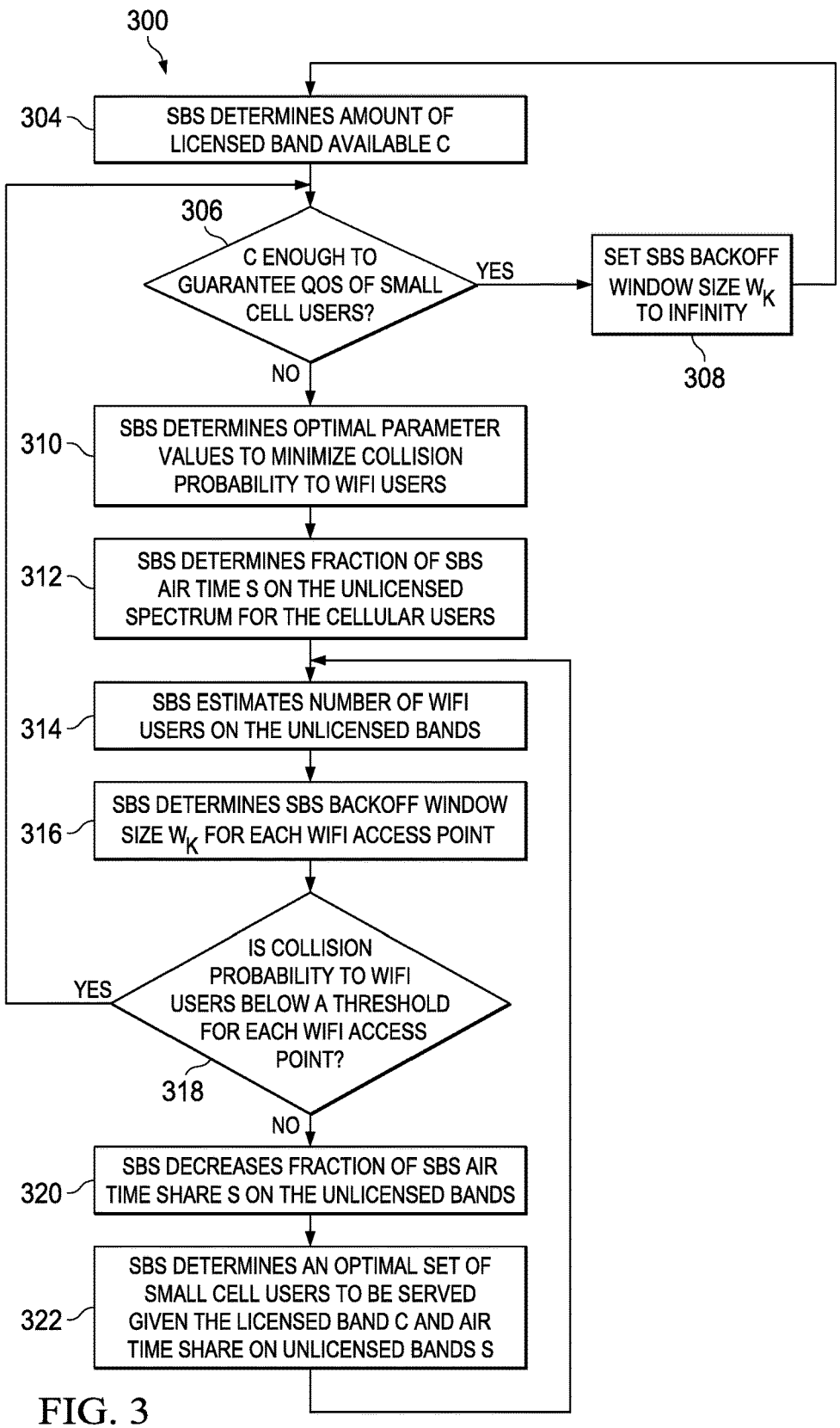
FIG. 3 illustrates an adaptive channel access scheme according to embodiments of the invention.

An adaptive channel access scheme 300 according to an embodiment is illustrated in the flow chart of FIG. 3. Here, the SBS uses different unlicensed bands of different WiFi APs. The minimum backoff window size W is calculated and the collision probability is determined for each unlicensed band.

The channel access scheme is similar to that of the embodiment describe in FIG. 2. The SBS determines the amount of available licensed band C in a first process step 304. The SBS then determines whether or not C is enough to guaranteed QoS for all cellular users 306. If it does the SBS sets the minimum backoff window sizes $W_k$ for each WiFi AP to infinity at 308. If not the SBS determines the optimal parameter values to minimize the collision probability to WiFi users in all unlicensed bands at 310.

This can be described as $$\min_{\{c_i^{(l)}, s_{k,i}^{(u)}, p_i^{(l)}\}_{i \in \mathcal{U}, k \in \{1, \ldots, K\}}} \max_k \left\{ \eta_1 \sum_{i \in \mathcal{U}} s_{1,i}^{(u)}, \ldots, \eta_K \sum_{i \in \mathcal{U}} s_{K,i}^{(u)} \right\},$$

wherein $\eta_k$ (for all k element $\{1, \ldots, K\}$) is the weighted factor on the utilization of the licensed bands from different WiFi APs. Then, at 312, the SBS determines the maximum fraction of SBS air time $S_k^{(u)}$ for each WiFi AP k and the weighted factor $\eta_k$ can be calculated according to $\eta_k = S^{(u)}_k / \Sigma k \in \{1, \ldots, K\} S^{(u)}_k$. Afterwards, at process blocks 314 and 316, the SBS estimates the number of WiFi users on the unlicensed bands and the minimum backoff window size $W_k$ for each WiFi AP. If collision probability to WiFi users is below a threshold for each WiFi AP the process advances to decision block 306 to iteratively start from there again. If the collision probability to WiFi users is above a threshold for at least one WiFi AP, the process advances to processing block 320. This means that the if the collision probability to any WiFi AP is over the threshold, then the collision probability to the remaining WiFi APs has also crossed the threshold due to the balanced property. The SBS makes this decision in decision block 318.

When the collision probability to WiFi users is above the threshold for at least one WiFi AP the SBS decreases the fraction of SBS air time share S on the at least one unlicensed band. For example, when the collision probabilities at two WiFi APs are over the threshold value then the collision probability at the remaining WiFi APs is also considered to be over the threshold value and SBS needs to decrease the fraction of SBS air time. The process then advances to process step 322 to determine an optimal set of cellular users to be served by the given available licensed band C and the fraction of the air time share S on the unlicensed bands. The process then in turn reiterates the process steps beginning at process block 314. In alternative embodiments the SBS only adjusts the fractions $S^{(u)}_k$ of the two WiFi APs that are over the threshold value while the $S^{(u)}_k$ remain unadjusted.

In some embodiment, if the threshold value is violated for only a few WiFi APs of a large plurality of WiFi APs the minimum backoff window size for these few WiFi APs can be increased by an estimated amount or by a set amount without going through the iteration and the calculation again. In some embodiments, the backoff window size for the few WiFi APs can be set to infinity.

The threshold values for the WiFi APs can be the same for all WiFi APS or can be different for some or all of them.

In some embodiments the cellular users to be selected should be the maximum number of cellular users served by the SBS.

$$\max_{\{I_i, c_i^{(l)}, s_{k,i}^{(u)}, p_i^{(l)}\}_{i \in \mathcal{U}}} \sum_{i \in \mathcal{U}} I_i,$$

wherein $I_i$ is an integer variable, when cellular user i is selected, $I_i=1$ or otherwise 0. This guarantees that the data rate of the selected cellular users is not less than requested.

Figure 4:
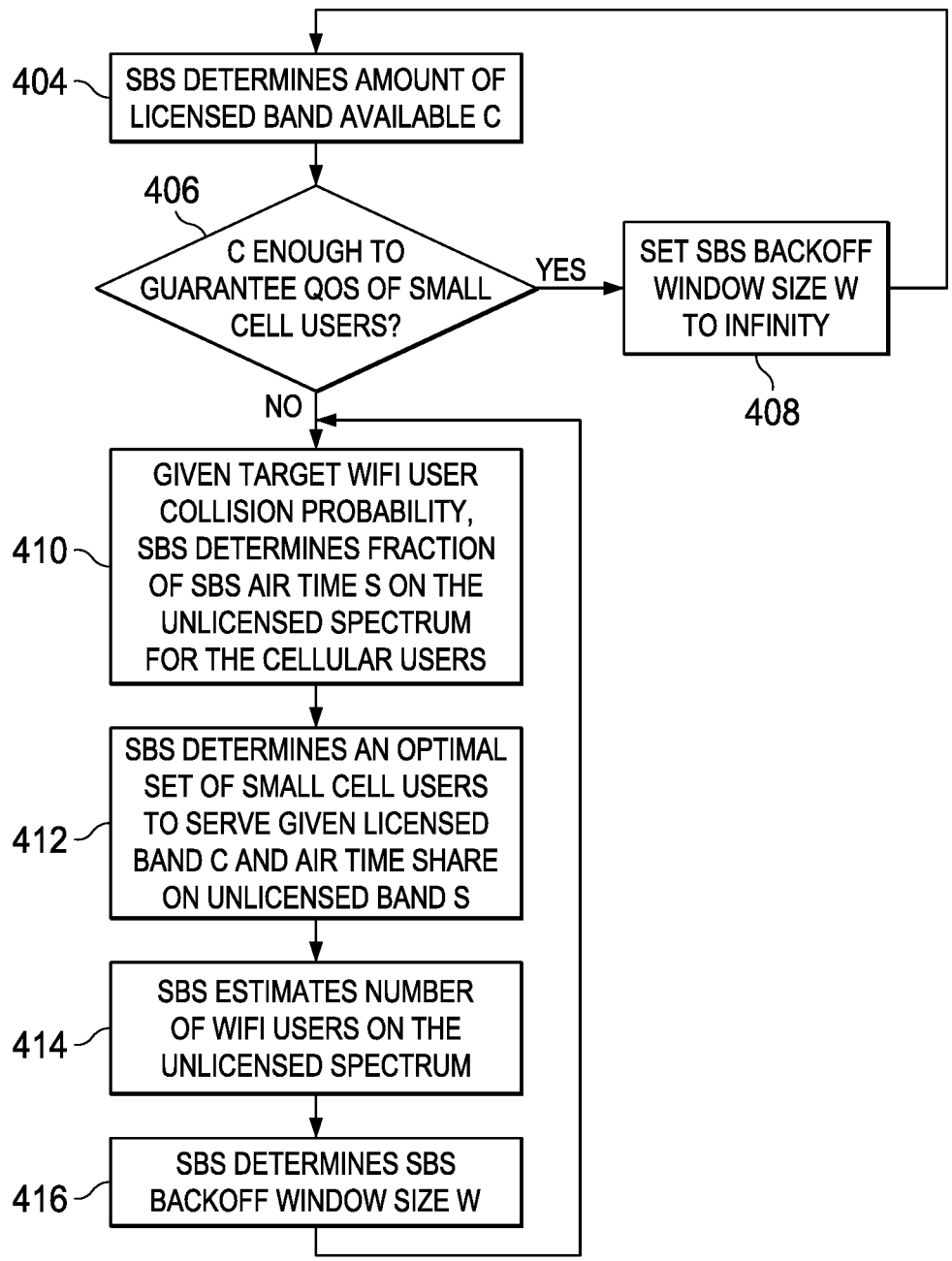
FIG. 4 illustrates an adaptive channel access scheme according to embodiments of the invention.

FIG. 4 shows an adaptive channel access scheme 400 for at least one WiFi AP according to an embodiment. Here, the process starts again by determining the availability of the licensed band C, 404. If there is enough available licensed band C the SBS does not use the unlicensed band(s) because the licensed band provides enough bandwidth to provide QoS to the cellular users at blocks 406-408.

If the SBS needs additional spectrum to serve the cellular users, the steps 410-416 provide such additional spectrum. In block 410, a target WiFi user collision probability is provided (e.g., set). The SBS determines the fraction of SBS air time S on the unlicensed spectrum for the cellular user for this probability. Then, in processing block 412, the SBS determines the set of cellular users to be served on the given licensed band C and the fraction of the air time share on the unlicensed band S. Thereafter, the SBS estimates the number of WiFi users on the unlicensed spectrum (processing block 414) and determines the minimum backoff window size W (processing block 416). The sequence processing block 410-416 may be iteratively repeated.

Figure 5:
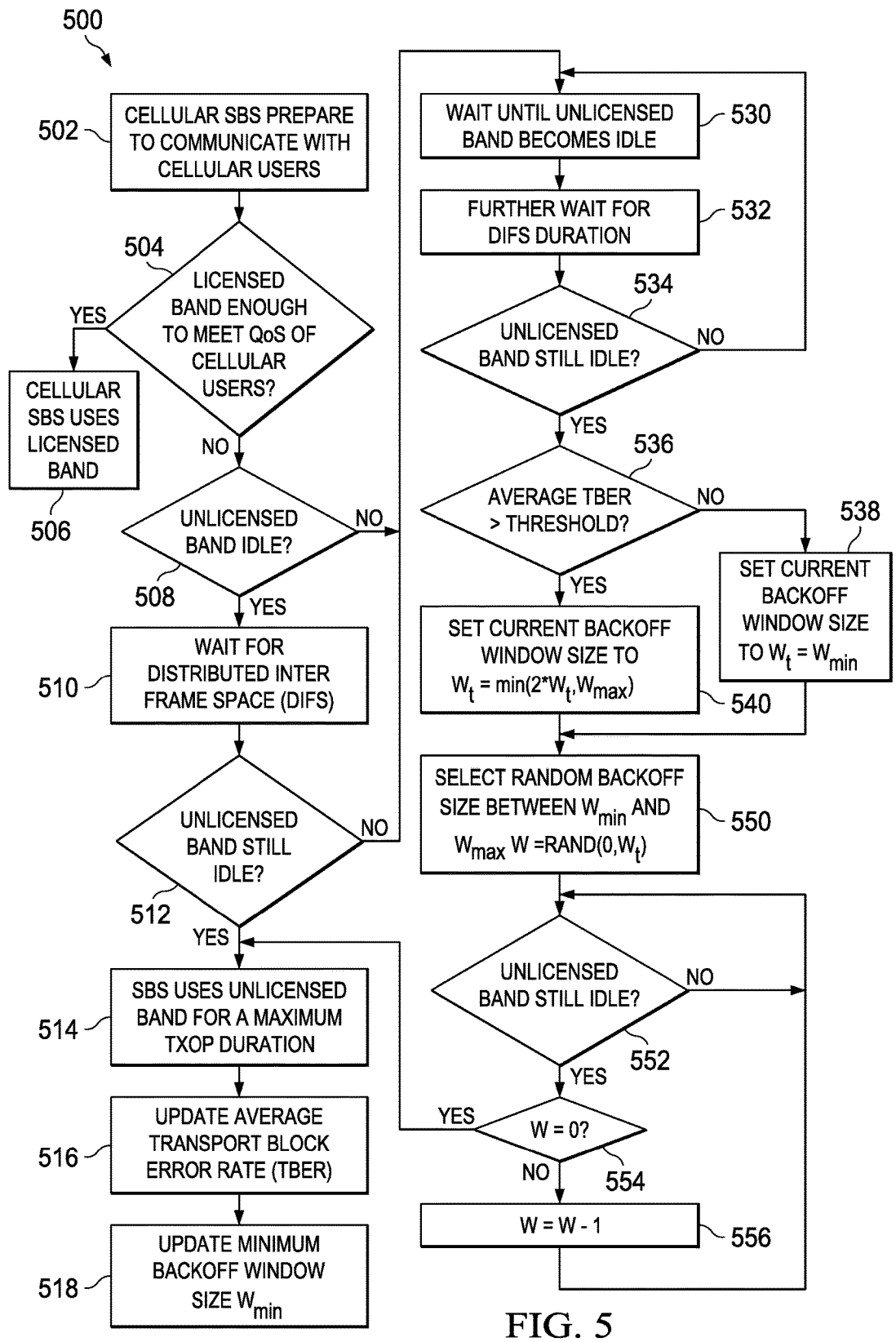
FIG. 5 illustrates an adaptive channel access scheme according to embodiments of the invention.

FIG. 5 shows an adaptive channel access scheme 500 for at least one WiFi AP according to an embodiment. Here, in a first step 502, the SBS initializes and prepares itself to communicate with cellular users. Then, in the next step, 504, the SBS determines whether or not enough licensed band is available to meet QoS for the cellular users. If there is enough available licensed band C the SBS does not use the unlicensed band(s) but rather only uses the licensed band 506. If there is not enough available licensed band C the SBS determines the possibility to access the unlicensed band.

Accordingly, the scheme 500 advances to decision block 508. At decision block 508 the SBS listens to the unlicensed band and evaluates whether the unlicensed band is idle. If it is idle, the process 500 moves to processing block 510. Here, the SBS waits for a distributed inter frame space (DIFS) duration. Then, in the next step 512, the SBS listens again to the unlicensed band and determines whether the unlicensed band is idle. In steps 508-512 the SBS may determine that the unlicensed band is idle for a certain time interval.

If the SBS the unlicensed band is idle, the SBS uses and transmits data on the unlicensed band for a maximum period of time in process block 514. E.g., the maximum period of time may be the transmission opportunity time (TXOP) as specified in 802.11. The TXOP may comprise a maximum frame length of 3 ms (or 3 subframes). In the next processing step 516 the SBS may update the average transport block error rate (TBER). When this is done, the SBS updates the minimum backoff window size $W_{min}$ in step 518. The update of the minimum backoff window size may be performed to other embodiments of the invention, in particular to the embodiments described in FIGS. 2 and 3. After the minimum backoff window size $W_{min}$ is updated the process 500 moves back to the beginning of the access scheme 500, process block 502. The process 500 may iterate once or several times all the process steps described supra.

Returning to decision blocks 508 and 512. When the determination whether the unlicensed band is idle is negative, the process 500 advances to process step 530. Then the SBS waits until the unlicensed band becomes idle. If the band is idle the SBS ensures to wait for DIFS duration 532. After waiting, the process 500 moves to decision block 534 in order to evaluate whether the unlicensed band is idle and if it is the process progresses to decision block 534. In the next decision block 536 the SBS determinates whether the average TBER (transport block error rate) is above a threshold. If the SBS determines no the current backoff window size is set to the minimum backoff window size $W_{min}$ in processing block 538. If the SBS determines yes, the current backoff window size $W_t$ is calculated to be the minimum of 2 times the current backoff window size $W_t$ and 2 times the maximum backoff window size $W_{max}$ in processing block 540.

Then in the next step 550 the backoff window size W is randomly selected to be in the interval of W=rand (0, $W_t$). In other words, the SBS selects the backoff window size W to be between 0 and the backoff window size $W_t$. In the next step the process advances to decision block 552. The SBS determines whether the unlicensed band is still idle. If the SBS determines no, the SBS repeats this determination until the unlicensed band is not idle anymore. If the unlicensed band is not idle, the process advances to decision block 554. Here the SBS evaluates whether the backoff window size W is 0. If the backoff window size W is not 0 the process moves to process block 556 which may set the backoff window size to the backoff window size minus a constant (such as the number 1). If the backoff window size is the backoff window size minus 1 the process moves to the input of decision block 552 and goes through the respective steps again. Is however the backoff window size 0 at block 554 the SBS moves the process to processing block 514 where the SBS may use the unlicensed band for a maximum duration of a TXOP.

Figure 6:
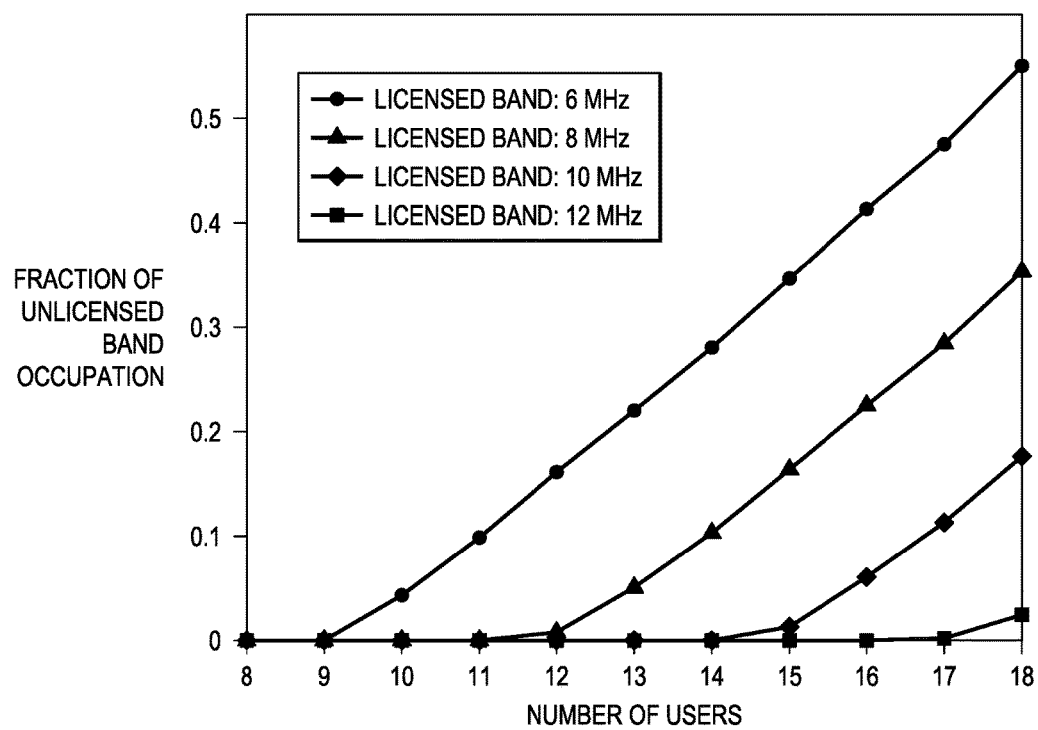
FIG. 6 illustrates the fractions of the unlicensed band occupied versus the number of served cellular users for different licensed spectrum bandwidths.

FIG. 6 shows the fraction of unlicensed band occupied versus the number of served cellular users for different licensed spectrum bandwidths when the SBS only shares the unlicensed band with one WiFi AP. As can be seen, when the available bandwidth of the licensed spectrum is fixed (e.g., 6 MHz, 8 MHz, 10 MHz, and 12 MHz) the requested unlicensed band in the SBS will increase as the number of cellular users increases in order to satisfy the QoS. When the number of cellular users is fixed more available licensed bandwidth means less utilization of the unlicensed band in the SBS. Accordingly, there may be a tradeoff between the available licensed bandwidth and the required unlicensed bandwidth in the SBS.

Figure 7:
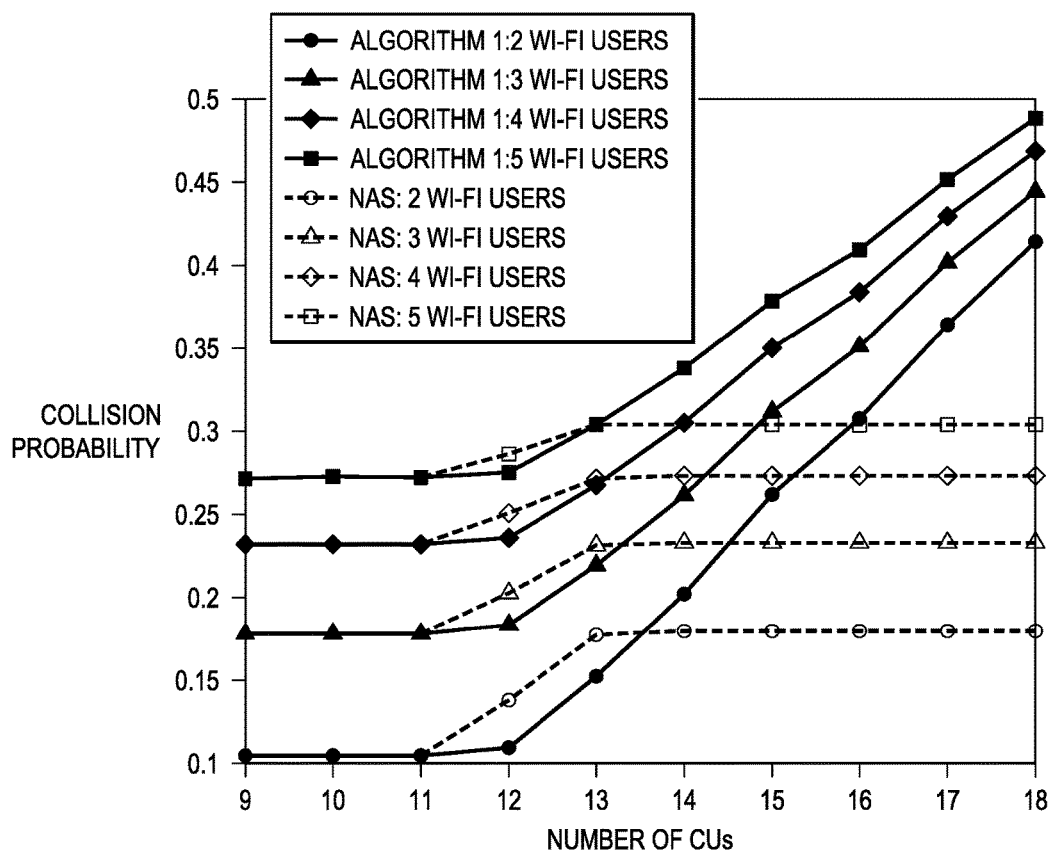
FIG. 7 illustrates an increase of collision probability when the number of cellular users increases.

When the number of cellular users increases more unlicensed spectrum is required to satisfy the QoS for the cellular users. Without implementing access control the collision probability brought to the WiFi users on the unlicensed band increases. This is shown in FIG. 7 for an available licensed bandwidth of 8 MHz. As can be seen, by adding cellular users to the unlicensed band the collision probability to the WiFi users dramatically increases. By providing an access control scheme for the cellular users the collision probability of the WiFi users is controlled. A fair collision probability for these users may be provided.

Figure 8:
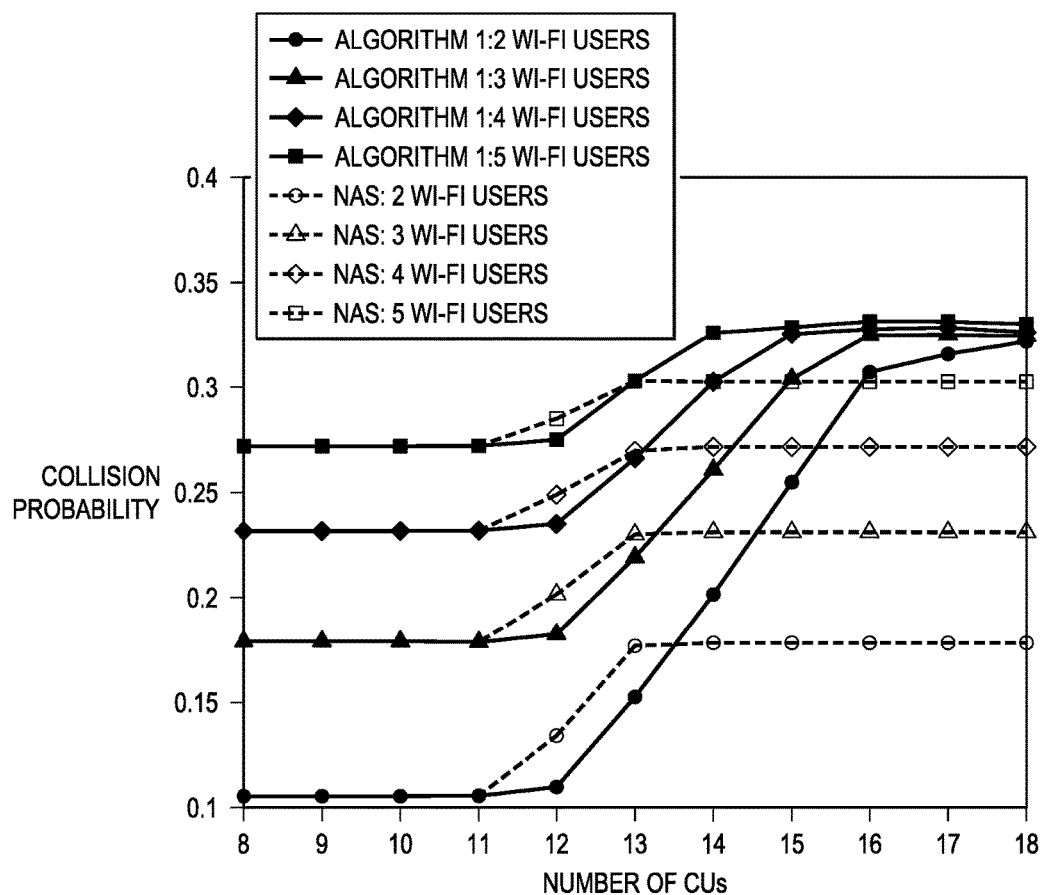
FIG. 8 illustrates an admission control scheme for the unlicensed band.

FIG. 8 shows the effect of an admission control for the SBS on the unlicensed band according to an embodiment. For up to 11 cellular users the achievable licensed bandwidth is enough to satisfy the QoS. Accordingly, the corresponding collision probability to the WiFi users is not related to and independent from the number of cellular users. However, when the number of cellular users is increased to 12-14 users the SBS requires a portion of the unlicensed band to serve all cellular users. Accordingly, adding additional users has an impact on the collision probability of the WiFi users and the collision probability of the WiFi users increase with the number of the cellular users. However, the collision probability of the WiFi users is below a determined or set threshold value. All cellular users can be served by the SBS. As is also shown in FIG. 8, the threshold value may be passed sooner when there are more WiFi users compared to when there are fewer WiFi users.

For 16 and more cellular users, the requested air time share on the unlicensed band in the SBS is too large so that access is cut off and only some of the cellular users can be served to keep the collision probability under the threshold value. As discussed before, the air time share of the unlicensed band can be adaptively adjusted to provide QoS to the cellular users according to the available licensed bandwidth, the WiFi traffic on the unlicensed band and the number of the cellular users.

Figure 9:
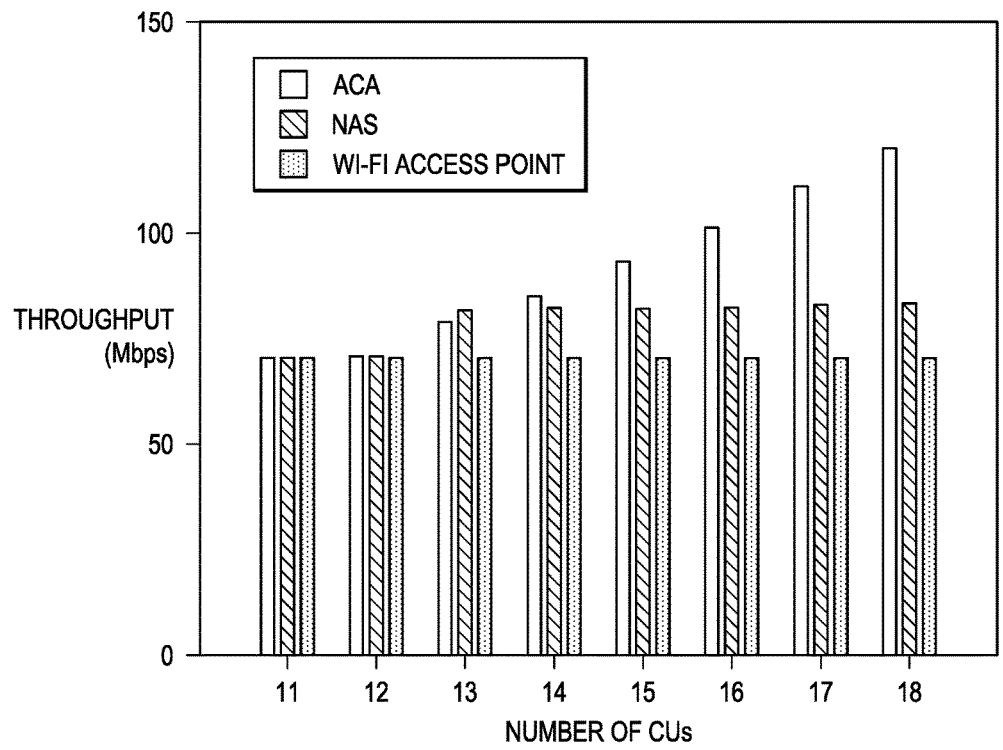
FIG. 9 illustrates the throughput of a number of cellular users according to different access schemes.

FIG. 9 illustrates results of a throughput on the unlicensed band based on different access schemes. ACA is the adaptive channel access scheme, NAS is the non-adaptive channel access scheme (where the SBS uses the same backoff parameters (e.g., minimum backoff window size) as the WiFi users) and EWS is known as an exclusive WiFi scheme (where the SBS is replaced by a WiFi AP, i.e., providing an exclusive WiFi network). FIG. 9 shows the throughput on the unlicensed band versus the number of cellular users. The achievable throughput on the unlicensed band increases as the number of cellular users increases for ACA and NAS while the throughput on unlicensed band for EWS does not increase. The throughput for the ACA is much better than for NAS because the SBS just takes enough unlicensed bandwidth to satisfy the QoS of the cellular users in ACA.

Figure 10:
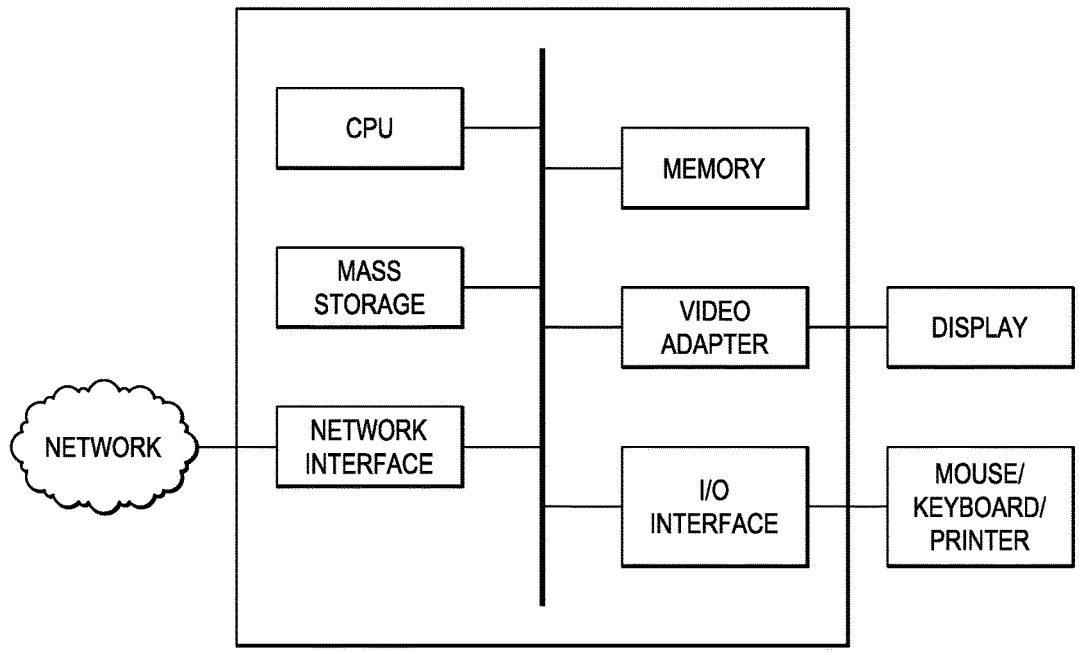
FIG. 10 illustrates a computing device for the SBS according to an embodiment.

FIG. 10 is a block diagram of a device that may implement embodiments of the access scheme disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The device may comprise a processing unit equipped with one or more input/output unit, such as a speaker, microphone, mouse, touchscreen, keypad, keyboard, printer, display, and the like. The processing unit may include a central processing unit (CPU), memory, a mass storage device, a video adapter, and an I/O interface connected to a bus. The device may be a base station or a small cell base station.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

The processing unit (CPU) may receive the cellular user information and the WiFi user information through the network interface. The CPU may calculate, estimate and determine different parameters (such as WiFi traffic, maximum available bandwidth on the unlicensed band, amount of achievable licensed bandwidth and backoff window size) and may store these parameter in the mass storage or the memory. The processing unit may communicate these parameters to the cellular users via the network interface.

Embodiments of the invention provide a method for adaptive channel access wherein the method comprises adaptively adjusting, by a small base station (SBS), access parameters for small cells to ensure quality of service (QoS) to cellular users while minimizing a collision probability to WiFi users, and wherein minimizing the collision probability to the WiFi users comprises keeping or decreasing an optimal backoff window size when the collision probability to the WiFi users is below a threshold value and increasing the optimal backoff window size when the collision probability to the WiFi users is above the threshold value.

Embodiments further provide that minimizing the collision probability to the WiFi users comprises estimating a number of WiFi users on an unlicensed spectrum or wherein minimizing the collision probability to the WIFI users comprises determining a fraction of SBS air time on an unlicensed spectrum.

Various embodiments provide that the access parameters are adjusted based on a WiFi traffic load, an achievable licensed bandwidth and QoS requirements of the cellular users.

Further embodiments provide that minimizing the collision probability to the WiFi users comprises ensuring QoS requirements for the cellular users that corresponds to minimum data rates for the cellular users, and wherein the minimum data rates depend on a combined transmit powers of the cellular users on a licensed band, a combined allocation of the cellular users on the licensed band, and a combined air time fraction of the cellular users on an unlicensed band.

Some embodiments provide that minimizing the collision probability to the WiFi users comprises setting the optimal backoff window size to infinity when a licensed spectrum provides enough bandwidth to guarantee QoS to the cellular users.

Yet other embodiments provide that increasing the optimal backoff window size comprises decreasing a fraction of SBS air time share on an unlicensed spectrum.

Embodiments of the invention provide a method for adaptive channel access, wherein the method includes determining, by a small base station (SBS), a fraction of SBS air time share on an unlicensed band for cellular users to ensure quality of service (QoS) for the cellular users, estimating, by the SBS, a number of WiFi users on the unlicensed band, adjusting, by the SBS, the fraction of SBS air time share on the unlicensed band for the cellular users when a collision probability to the WiFi users is above a threshold value and not adjusting, by the SBS, the fraction of SBS air time share on the unlicensed band for the cellular users when the collision probability to the WiFi users is below the threshold value.

Further embodiments provide determining the fraction of SBS air time share comprises minimizing the collision probability to the WiFi users.

Other embodiments provide minimizing the collision probability to the WiFi users comprises ensuring QoS requirements for the cellular users that corresponds to minimum data rates for the cellular users, and wherein the minimum data rates depend on a combined transmit powers of the cellular users on a licensed band, a combined allocation of the cellular users on the licensed band, and a combined air time fraction of the cellular users on an unlicensed band.

Yet other embodiments further include keeping or reducing an optimal backoff window size when the collision probability to the WiFi users is below the threshold value and keeping or increasing the optimal backoff window size when the collision probability to the WiFi users is above the threshold value.

Some embodiments further includes determining, by the SBS, whether or not an achievable licensed band is enough to ensure the QoS for the cellular users, setting an SBS backoff window size to infinity when there is enough achievable licensed band available and setting the SBS backoff window size to an optimal backoff window size when there is not enough achievable licensed band available.

Various embodiments include adjusting the fraction of SBS air time share on the unlicensed band for the cellular users comprises reducing the fraction of SBS air time share on the unlicensed band for the cellular users.

Some embodiments further include determining, by the SBS, an optimal set of the cellular users to be served on a licensed band and the fraction of SBS air time share on the unlicensed band.

Embodiments further include evaluating, by the SBS, whether the unlicensed band is idle, sending data, by the SBS, for a maximum transmission opportunity duration (TXOP) when the unlicensed band is idle and update an average transport block error rate (TBER).

Embodiments of the invention provide a small base station (SBS) including a processor and a non-transitory computer readable storing medium storing programming for execution by the processor, the programming including instruction to adaptively adjust access parameters for a small cell to ensure quality of service (QoS) to cellular users while minimizing a collision probability to WiFi users, wherein minimizing the collision probability to the WiFi users comprises keep or decrease an optimal backoff window size when the collision probability to the WiFi users is below a threshold value and increase the optimal backoff window size when the collision probability to the WiFi users is above the threshold value.

Some embodiments include that the access parameters are adjusted based on a WiFi traffic load, an achievable licensed bandwidth, and QoS requirements of the cellular users.

Various embodiments include that minimizing the collision probability to the WiFi users comprises ensuring QoS requirements for the cellular users that corresponds to minimum data rates for the cellular users, and wherein the minimum data rates depend on a combined transmit powers of the cellular users on a licensed band, a combined allocation of the cellular users on the licensed band, and a combined air time fraction of the cellular users on an unlicensed band.

Other embodiments include that increasing the optimal backoff window size comprises decreasing a fraction of SBS air time share on an optimal unlicensed band.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adaptive channel access, the method comprising:
   determining, by a small base station (SBS), a collision probability among WiFi users of an unlicensed band based on an estimated number of WiFi users and a channel access probability of the SBS using the unlicensed band;
   adjusting, by the SBS, access parameters for cellular users served by the SBS to share air time on the unlicensed band according to quality of service (QoS) requirements for the cellular users, subject to a comparison between the collision probability among the WiFi users of the unlicensed band and a collision probability threshold;
   determining a fraction of the air time on the unlicensed band to be used by the cellular users according to the access parameters; and
   determining a maximum number of cellular users that can be admitted to the SBS according to the fraction of the air time on the unlicensed band to be used by the cellular users.

2. The method according to claim 1, wherein adaptively adjusting the access parameters comprises minimizing the collision probability to the WiFi users, wherein minimizing the collision probability to the WiFi users comprises:
   keeping or decreasing an optimal backoff window size when the collision probability to the WiFi users is below a threshold value; and
   increasing the optimal backoff window size when the collision probability to the WiFi users is above the threshold value.

3. The method according to claim 2, wherein minimizing the collision probability to the WIFI users comprises at least one of estimating a number of WiFi users on an unlicensed spectrum and determining a fraction of SBS air time on an unlicensed spectrum.

4. The method according to claim 1, wherein the access parameters are adjusted based on a WiFi traffic load, an achievable licensed bandwidth and QoS requirements of the cellular users.

5. The method according to claim 1, wherein minimizing the collision probability to the WiFi users comprises ensuring QoS requirements for the cellular users that corresponds to minimum data rates for the cellular users, and wherein the minimum data rates depend on a combined transmit powers of the cellular users on a licensed band, a combined allocation of the cellular users on the licensed band, and a combined air time fraction of the cellular users on an unlicensed band.

6. The method according to claim 1, wherein minimizing the collision probability to the WiFi users comprises setting the optimal backoff window size to infinity when a licensed spectrum provides enough bandwidth to guarantee QoS to the cellular users.

7. The method according to claim 2, wherein increasing the optimal backoff window size comprises decreasing a fraction of SBS air time share on an unlicensed spectrum.

8. A method for adaptive channel access, the method comprising:
   determining, by a small base station (SBS), a fraction of SBS air time share on an unlicensed band for cellular users to ensure quality of service (QoS) for the cellular users;
   determining a maximum number of cellular users that can be admitted to the SBS according to the fraction of the air time on the unlicensed band to be used by the cellular users;
   estimating, by the SBS, a number of WiFi users on the unlicensed band;
   determining, by the SBS, a collision probability among WiFi users of the unlicensed band based on the estimated number of WiFi users and a channel access probability of the SBS using the unlicensed band;
   adjusting, by the SBS, the fraction of SBS air time share on the unlicensed band for the cellular users when the collision probability to the WiFi users is above a threshold value; and not adjusting, by the SBS, the fraction of SBS air time share on the unlicensed band for the cellular users when the collision probability to the WiFi users is below the threshold value.

9. The method according to claim 8, wherein determining the fraction of SBS air time share comprises minimizing the collision probability to the WiFi users.

10. The method according to claim 9, wherein minimizing the collision probability to the WiFi users comprises ensuring QoS requirements for the cellular users that corresponds to minimum data rates for the cellular users, and wherein the minimum data rates depend on a combined transmit powers of the cellular users on a licensed band, a combined allocation of the cellular users on the licensed band, and a combined air time fraction of the cellular users on an unlicensed band.

11. The method according to claim 8, further comprising:
keeping or reducing an optimal backoff window size when the collision probability to the WiFi users is below the threshold value; and
keeping or increasing the optimal backoff window size when the collision probability to the WiFi users is above the threshold value.

12. The method according to claim 8, further comprising:
determining, by the SBS, whether or not an achievable licensed band is enough to ensure the QoS for the cellular users;
setting an SBS backoff window size to infinity when there is enough achievable licensed band available; and
setting the SBS backoff window size to an optimal backoff window size when there is not enough achievable licensed band available.

13. The method according to claim 8, wherein adjusting the fraction of SBS air time share on the unlicensed band for the cellular users comprises reducing the fraction of SBS air time share on the unlicensed band for the cellular users.

14. The method according to claim 13, further comprising determining, by the SBS, an optimal set of the cellular users to be served on a licensed band and the fraction of SBS air time share on the unlicensed band.

15. The method according to claim 8, further comprising:
evaluating, by the SBS, whether the unlicensed band is idle;
sending data, by the SBS, for a maximum transmission opportunity duration (TXOP) when the unlicensed band is idle; and
update an average transport block error rate (TBER).

16. A small base station (SBS) comprising:
a processor; and
a non-transitory computer readable storing medium storing programming for execution by the processor, the programming including instruction to:
determining, by a small base station (SBS), a collision probability to WiFi users of an unlicensed band based on an estimated number of WiFi users and a channel access probability of the SBS using the unlicensed band;
adaptively adjust access parameters for cellular users served by the SBS to share air time on an unlicensed band according to quality of service (QoS) requirements for the cellular users, subject to a comparison between the collision probability to WiFi users of the unlicensed band and a collision probability threshold;
determine a fraction of the air time on the unlicensed band to be used by the cellular users according to the access parameters; and
determining a maximum number of cellular users that can be admitted to the SBS according to the fraction of the air time on the unlicensed band to be used by the cellular users.

17. The small base station according to claim 16, wherein the instructions to adaptively adjust the access parameters comprises instructions to minimize the collision probability to the WiFi users, wherein the instructions to minimize the collision probability to the WiFi users comprises instructions to:
keep or decrease an optimal backoff window size when the collision probability to the WiFi users is below a threshold value; and
increase the optimal backoff window size when the collision probability to the WiFi users is above the threshold value.

18. The small base station according to claim 17, wherein the instructions to minimize the collision probability to the WiFi users comprise instructions to ensure QoS requirements for the cellular users that correspond to minimum data rates for the cellular users, and wherein the minimum data rates depend on a combined transmit powers of the cellular users on a licensed band, a combined allocation of the cellular users on the licensed band, and a combined air time fraction of the cellular users on an unlicensed band.

19. The small base station according to claim 17, wherein increasing the optimal backoff window size comprises decreasing a fraction of SBS air time share on an optimal unlicensed band.

20. A small base station (SBS) comprising:
a processor; and
a non-transitory computer readable storage medium storing programming for execution by the processor, the programming including instructions for:
initializing a maximum fraction of SBS air time shared on an unlicensed spectrum according to a WiFi traffic estimate;
determining that an amount of available licensed spectrum does not guarantee a quality of service (QoS) to small cell users;
determining power and rate optimization to minimize a collision probability of WiFi users; and
determining an SBS backoff window size according to the maximum fraction of SBS air time, the WiFi traffic estimate, the QoS, the power optimization, and the rate optimization.

* * * * *